Nov. 27, 1934.    C. G. HILGENBERG ET AL    1,982,253
AUTOMATIC GLASS FEED
Filed March 4, 1931    4 Sheets-Sheet 3
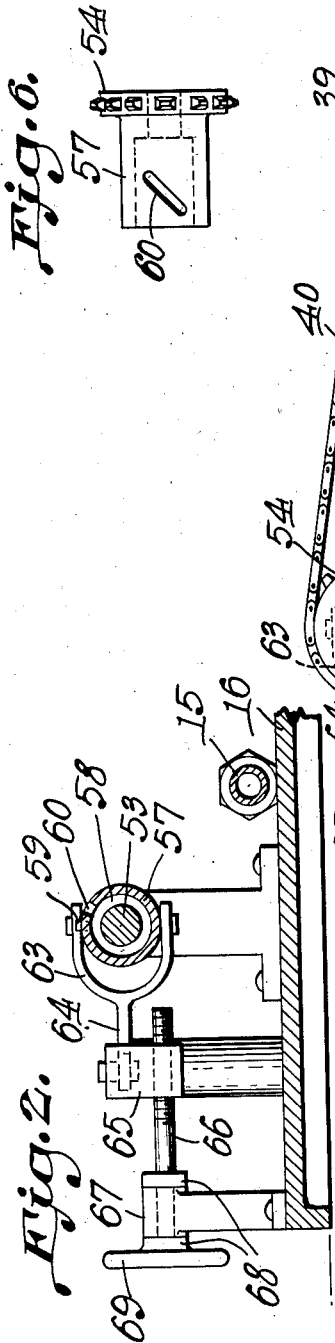
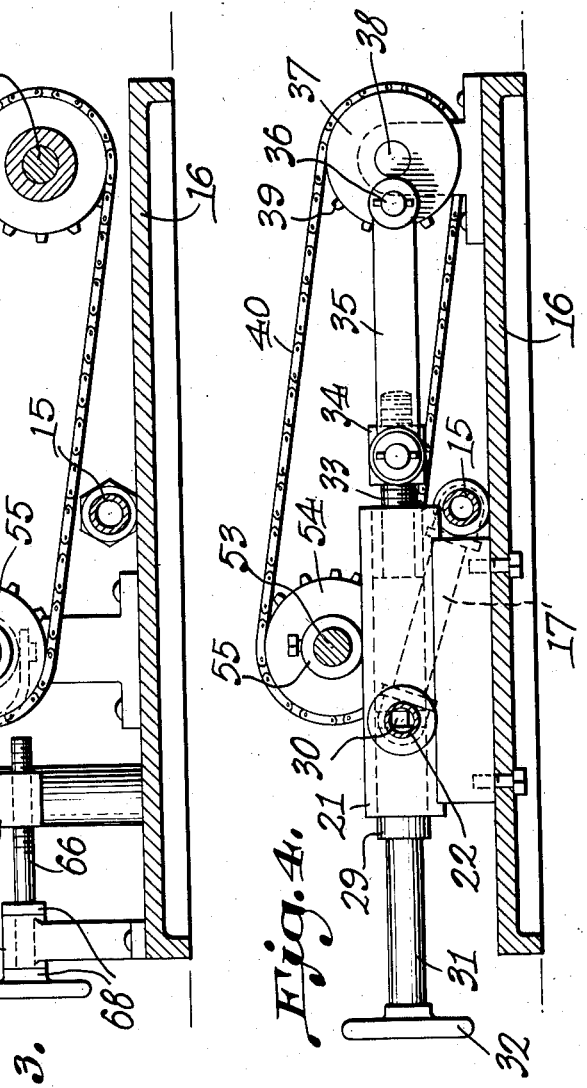
C. G. Hilgenberg and
C. B. Garwood    Inventors
By C. A. Snow & Co.
Attorneys Patented Nov. 27, 1934

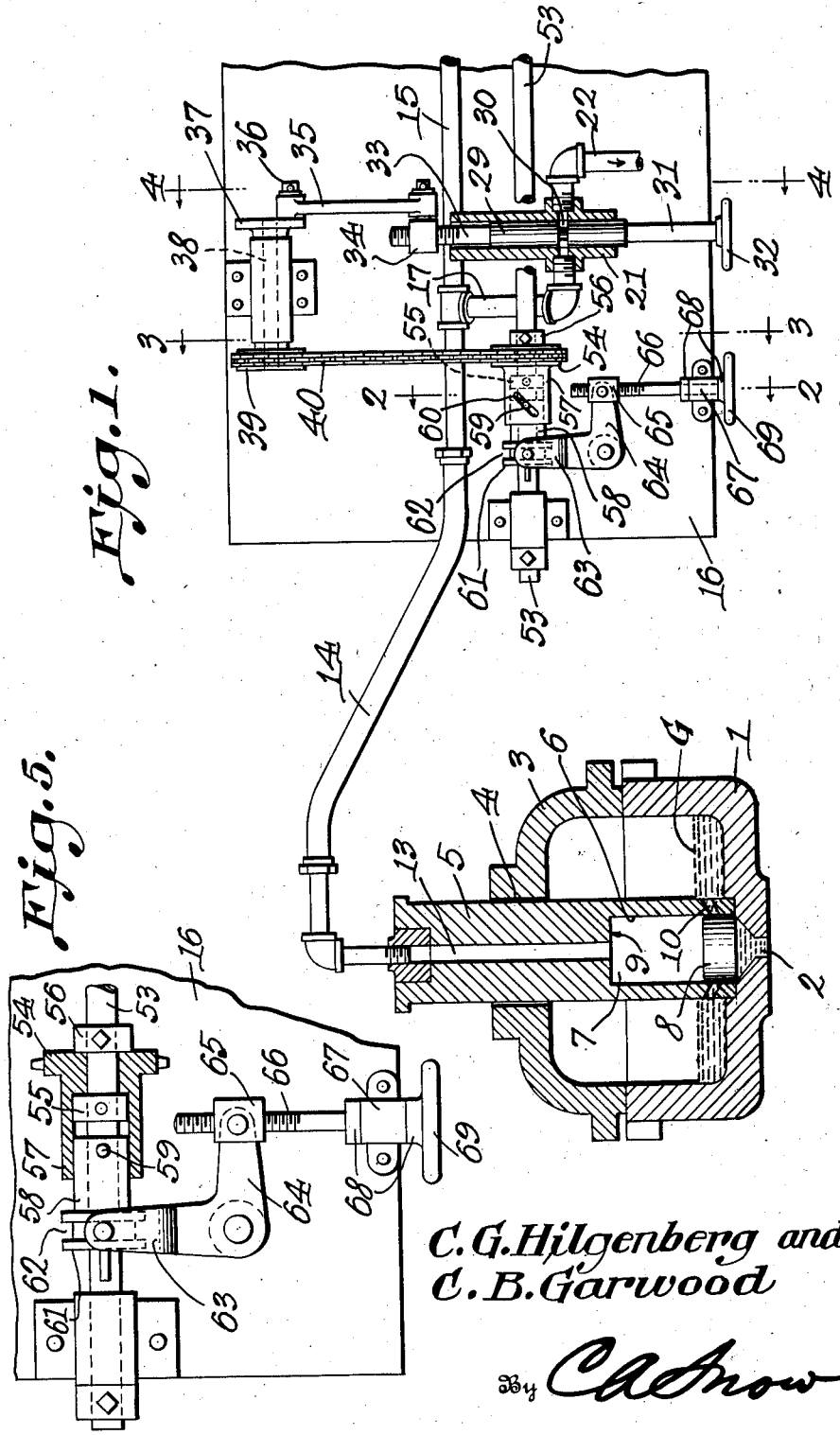

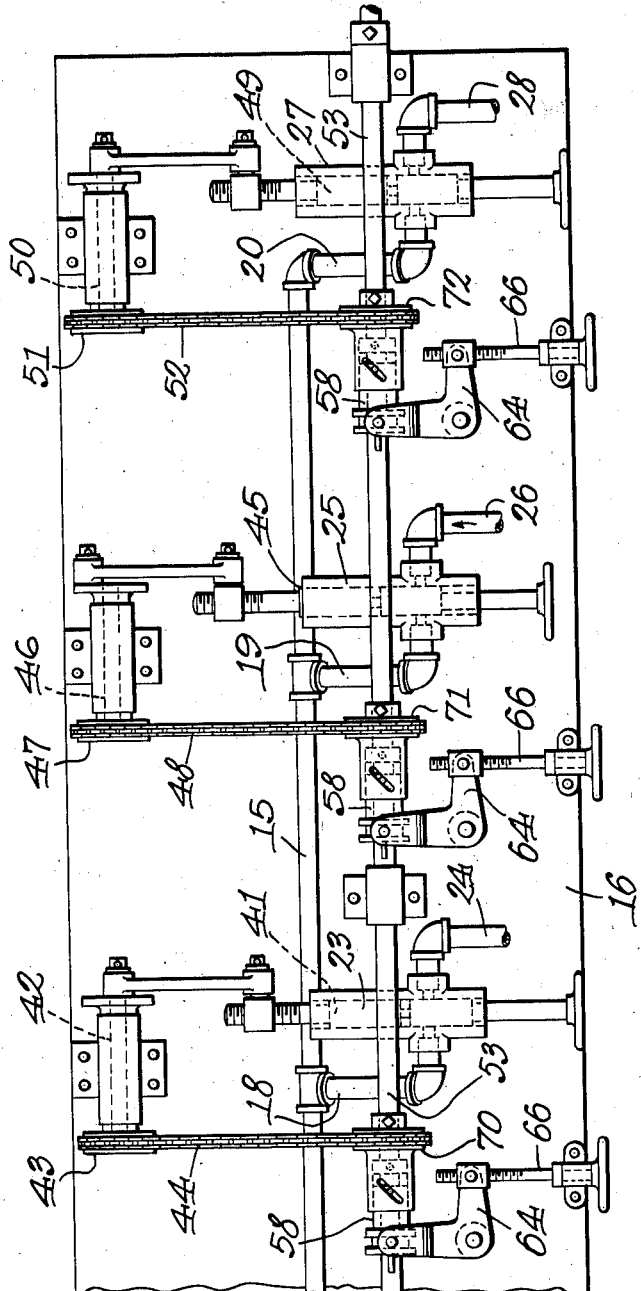

1,982,253

UNITED STATES PATENT OFFICE 1,982,253

AUTOMATIC GLASS FEED

Carl G. Hilgenberg and Charles B. Garwood, Baltimore, Md., assignors to Carr-Lowrey Glass Co., Baltimore, Md.

Application March 4, 1931, Serial No. 520,077

14 Claims. (Cl. 49—55)

This invention relates to a feeding mechanism for glass machines whereby gathers of desired size can be delivered in properly timed succession to the glass shaping mechanism.

Heretofore it has been the practice to provide a forehearth extending from a glass furnace and containing a plunger which has operated intermittently to eject the glass in predetermined quantities so that it can be cut off and delivered to the mold.

It is an object of the present invention to dispense with the use of positively driven plungers and thereby avoid certain objections which have resulted from their use and, in lieu thereof, utilize air under pressure as an ejecting medium.

Another object is to provide a means for controlling the air in the system so as to successively measure a portion of the molten glass by the use of suction, thereafter break the suction, then apply air under pressure to eject the measured portion and finally restore the system to its normal condition by releasing the pressure.

A still further object of this invention is to provide a means whereby the timing of the mechanism can be minutely adjusted at the will of the operator without interfering with the operation of the machine.

With the foregoing and other objects in view which will appear as the description proceeds, the invention resides in the combination and arrangement of parts and in the details on construction hereinafter described and claimed it being understood that changes in the precise embodiment of the invention herein disclosed may be made within the scope of what is claimed without departing from the spirit of the invention.

In the accompanying drawings, the preferred form of the invention has been shown.

In said drawings:

Figure 1 is a view partly in section and partly in plan showing one end portion of the apparatus, said view being more or less in diagram.

Figure 1a is a plan view of the remaining portion of the apparatus.

Figure 2 is an enlarged section on line 2—2, Figure 1.

Figure 3 is an enlarged section on line 3—3, Figure 1.

Figure 4 is an enlarged section on line 4—4, Figure 1.

Figure 5 is a plan view of the structure shown in Figure 2 and illustrates, in section, the sprocket controlled thereby.

Figure 6 is an elevation of said sprocket and its sleeve.

Figure 7:
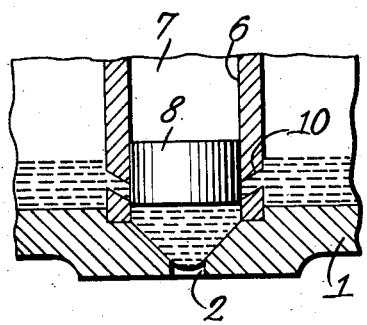
Figure 7 is a view on a reduced scale of a portion of the forehearth showing the cutoff valve partly raised to suck the tail of the glass back into the outlet.

Referring to the figures by characters of reference, 1 designates the forehearth of a glass furnace which can be of any preferred construction with a tapered outlet 2 in the bottom thereof and a cover 3. Seated on the bottom of the forehearth and extending upwardly through an opening 4 in the cover thereof is a tubular stem 5, the lower portion of which is counterbored as at 6 to form a suction chamber 7 in which is located a valve 8. This valve can be in the form of a block of fire clay or other suitable material made cylindrical or of other desired shape and capable of floating on the molten glass G contained within the forehearth. The upper end 9 of the suction chamber 7 provides a seat and stop for the valve. Ports 10 are provided in the lower portion of the wall of suction chamber 7 and preferably diverge upwardly to points near the surface of the molten glass G. The suction chamber 7 is preferably of substantially the same diameter as the large upper end of the tapered outlet 2 and registers with it.

The passage 13 which extends through stem 5 from the suction chamber 7 is in communication through a tube 14 with an air pipe 15 supported on any suitable structure, such as a table 16. This pipe has a series of branch pipes 17, 18, 19 and 20 extending therefrom.

Pipe 17 opens into one side of a tubular valve casing 21 which is open at its ends. This valve casing has another pipe 22 opening thereinto diametrically opposite the point of communication with pipe 17. Pipe 22 is connected to a suitable suction mechanism which can be in the form of a suction fan, a vacuum tank or the like, not shown. Pipe 18 opens into a tubular valve casing 23 which, like casing 21, has open ends. At a point diametrically opposite its connection with pipe 18 the valve casing 23 is provided with a pipe 24 opening into the atmosphere.

The branch pipe 19 opens into a valve casing 25 of the same construction as casings 21 and 23 and extending from this casing 25 at a point opposite the connection with pipe 19 is a pipe 26 leading to a source of air under pressure which can be a blower, an air tank or the like.

Pipe 20 opens into a valve casing 27 similar to the other valve casings and communicates with the atmosphere through a pipe 28 or other suitable means.

Slidable in the valve casing 21 is a valve 29 having an annular groove 30 adapted, when in one position, to communicate with both the inlet and the outlet of the valve casing. This valve has a stem 31 projecting from one end which can be rotated by any suitable means, such as a head 32. Another stem 33 which is screw-threaded is adjustably engaged by a nut 34 to which is pivotally attached one end of a pitman 35. The other end of this pitman is carried by the wrist pin 36 of a crank 37 which rotates with a shaft 38. A sprocket 39 is secured to this shaft and, in the structure illustrated, receives motion from a chain 40.

It will be obvious that when shaft 38 is rotated the valve 29 will be reciprocated and intermittently establish and cut off communication between the pipes 17 and 22. By rotating the valve the stem 33 can be adjusted longitudinally relative to the nut 34 thereby to regulate the flow of air between pipes 22 and 17 while they are in communication. In other words by this means of adjustment the valve groove 30 can be brought to any desired position in the casing when the valve reaches either limit of its movement.

Another valve similar to valve 29 is mounted for reciprocation in casing 23 and has been indicated at 41. This valve is adjustably connected in the manner hereinbefore described to a shaft 42 to which is secured a sprocket 43 which can be driven by a chain 44.

A valve 45 similar to the valves 29 and 41 is rotatably and slidably mounted in the casing 25 and is connected in the same manner as the other valves to shaft 46 to which is secured a sprocket 47 adapted to be driven by a chain 48.

Casing 27 has a valve 49 similar to the other valves and connected in like manner to a shaft 50 having a sprocket 51 driven by a chain 52.

It is designed to have the cranks on the several shafts 38, 42, 46 and 50 so disposed as to operate the respective valves in proper succession to produce the operations hereinafter described.

A drive shaft 53 is mounted for rotation and carried on this shaft is a sprocket 54 which engages and drives chain 40. This sprocket is held against movement longitudinally of the shaft by collars 55 and 56. A sleeve 57 is extended from one side of the sprocket and is spaced from shaft 53, the collar 55 being seated in one end of the sleeve as shown in Figure 5.

Feathered on shaft 53 is a tubular plunger 58 having an outwardly extending pin 59 which extends into a short obliquely disposed or spiral slot 60 formed in sleeve 57. A collar 61 is formed on the plunger and has an annular groove 62 engaged by the forked end 63 of a bell crank 64. The other end of this bell crank is pivotally connected to a nut 65 in which is located an adjusting screw 66 mounted for rotation in a bracket 67 but held against sliding movement by collar 68. Any suitable means, such as a head 69 can be used for rotating the screw.

As the plunger 58 is feathered on shaft 53 it will rotate therewith and can also slide longitudinally thereof. By rotating the screw 66 the bell crank 64 can be actuated to move plunger 58 in either direction within the sleeve 57, thereby causing the pin 59 to move to the right or to the left relative to the slot 60 and cause an annular adjustment of sleeve 57 and sprocket 54 relative to shaft 53. Obviously this adjustment can be made while the shaft is rotating and it will serve either to advance or retard the operation of the parts driven by sprocket 54.

Chains 44, 48 and 52, like chain 40, are driven by sprockets 70, 71 and 72 respectively and each of these sprockets is provided with a means for adjusting it annularly relative to shaft 53 while the shaft is rotating. These adjusting means are all the same as the means heretofore described and which has been illustrated in Figure 5, each means including the screw 66, bell crank 64, plunger 58 and the several parts cooperating therewith as before explained.

Figure 8:
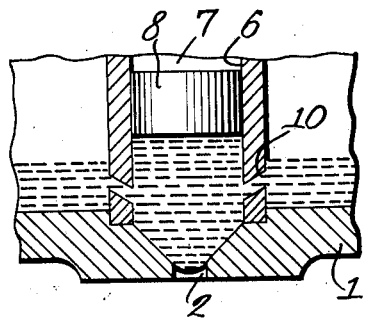
Figure 8 is a similar view showing the cutoff valve raised with a full charge of glass thereunder.

The operation of this apparatus is as follows: Assuming that a quantity of molten glass has been supplied to the forehearth as shown at G, valve 29 is brought momentarily to the position shown in Figure 1 and as pipe 22 leads to a suction means, a suction will be set up momentarily through pipes 17 and 14 from passage 13. This suction will be sufficient to elevate the valve 8 within the suction chamber 7 to draw back into said chamber any small amount of glass left at the outlet 2 following the severance of the glass at the outlet and as shown in Fig. 7. Thus the shear mark left on the tail of the glass at the outlet will be obliterated. As the valve 8 continues to rise under the action of suction the ports 10 will be opened and a portion of the molten glass G equal to the amount to be ejected will enter chamber 7. The glass is taken from the surface where it is hottest and in its most liquid state and the valve 8 will rise with the inflowing surface glass and can, if necessary, ultimately engage its seat 9, thereby preventing the glass from flowing into passage 13. By adjusting valve 29 longitudinally as heretofore explained the amount of suction can be regulated. By adjusting sprocket 54 annularly the time of operation of valve 29 with respect to the rotation of shaft 53 can be advanced or retarded. When the valve reaches its upper position as explained, and as shown in Figure 8, the molten glass will of course fill the space beneath the valve.

Figure 9:
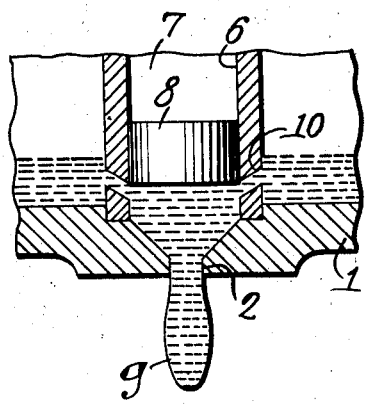
Figure 9 is a similar view showing the cutoff valve partly lowered by pressure to cause the initial ejection of the molten glass and the formation of an incomplete gob.
Figure 10:
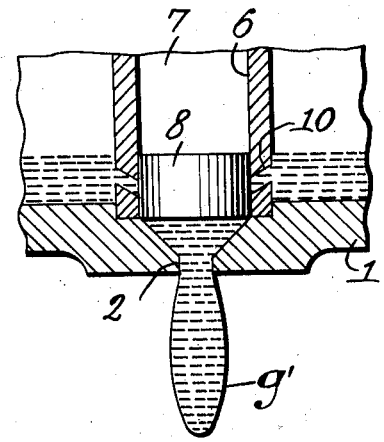
Figure 10 is a view similar to Figure 9 showing the position of the cutoff valve upon the completion of its downward stroke and the completion of the formation of the gob.

Following the suction of a charge of glass into the chamber 7 and the closing of valve 29, valve 41 will be brought into position to establish communication between the pipes 18 and 24 so that the suction will be broken and immediately thereafter valve 45 will establish communication between the pipes 19 and 26 so as to direct air under pressure into the pipe 15 and thence to the top of the valve 8, thereby to cause the molten glass to be ejected downwardly from chamber 7. As long as the ports 10 are open, the pressure exerted by the descending valve will be distributed to the glass at the ports and the glass at outlet 2. Consequently the glass will issue from outlet 2 so as to form an incomplete gob $g$ as shown in Figure 9. However when the valve 8 descends so as to close ports 10, all of the pressure exerted thereby will be transmitted to the molten glass trapped thereunder with the result that this glass will be forcibly ejected through the outlet 2 and will tend not only to elongated the gob but also to build out the neck portion thereof as shown in Figure 10, thereby bringing the gob to proper size and form for shearing, as shown at g'. At that time valve 45 closes and this is followed by the movement of valve 49 to a position where communication of the pipes 20 and 28. This results in restoration of atmospheric pressure in the apparatus after which the cycle of operations which has been described will be repeated.

Importance is attached to the fact that the operation of the several valves can be advanced or retarded to insure the performance of the successive operations correctly at timed intervals. Importance is also attached to the fact that the valves can be adjusted individually to control the pressures. As before stated the surface glass only is used in the formation of the ejected gobs. It has been long recognized that the surface glass, which is hotter, more liquid, and more agitated than the glass at the lower levels, produces better results than the glass at the bottom which is sluggish. It is undesirable to mix the surface glass with the bottom glass because in the finished article the two kinds of glass will have different coefficients of expansion and the produced ware will crack easily. Also the appearance of the glass will differ. As far as we are aware bottom feeds heretofore devised have utilized the bottom glass instead of the more desirable surface glass and this difference constitutes one of the important advances in the art devised by us.

What is claimed is:

1. The combination with a forehearth for holding molten glass, of apparatus for feeding molten glass including a tubular member extending upwardly from the bottom of the forehearth and providing a suction chamber having an outlet for glass at its bottom and an inlet spaced above its bottom, a float in the tubular member for closing the inlet and outlet, automatic means for establishing a suction in said chamber to actuate the float and draw a portion of molten surface glass through the inlet, automatic means for breaking the suction, means for automatically subjecting the float in the chamber to the action of air under pressure to eject a portion of the glass through the outlet, and means for advancing or retarding the time of operation of the suction and pressure controlling means.

2. The combination with a forehearth for holding molten glass, of glass feeding apparatus including a tubular member extending upwardly from the bottom of the forehearth and providing a suction chamber having an outlet for molten glass at its bottom and an inlet for surface glass spaced upwardly from its bottom, a suction pipe, an air pressure pipe, separate valves for controlling communication between said pipes and the suction chamber, a float in said chamber for closing the inlet and outlet and means for operating the valves to successively create a suction in the chamber to shift the float thereby to draw a charge of molten glass through the inlet and subsequently subject said float to the action of air under pressure to eject the glass through the outlet.

3. The combination with a forehearth for holding molten glass, of apparatus for feeding molten glass including a tubular stem extending upwardly from the bottom of the forehearth and providing a suction chamber having an outlet for molten glass at the bottom thereof and an inlet for surface glass spaced upwardly from said bottom, a suction pipe, an air pressure pipe, a valve for controlling suction from said chamber to the suction pipe, a valve for controlling air pressure to said chamber, a float in said chamber for closing the inlet and outlet, and means for operating said valves to successively draw the float from closed position to suck a charge of molten surface glass into the chamber from the inlet and subsequently to apply air pressure to the float to eject said charge through the outlet.

4. The combination with a forehearth for holding molten glass, of apparatus for feeding molten glass including a tubular member supported by and extending upwardly from the bottom of the forehearth, said member providing a suction chamber having an outlet for molten glass at the bottom thereof and an inlet for glass spaced upwardly from said bottom, a suction pipe, an air pressure pipe, a valve for controlling suction from said chamber to the suction pipe, a valve for controlling air pressure to said chamber, a float in said chamber for closing the inlet and outlet, means for operating said valves to successively shift the float from closed position to suck a charge of molten surface glass into the chamber from the inlet and thereafter to subject the float to air pressure to eject said charge through the outlet, and means for automatically establishing atmospheric pressure between said suction and pressure operations.

5. In glass feeding apparatus the combination with a forehearth and a tubular stem seated on the bottom of the forehearth having a suction chamber opening downwardly through the forehearth and an inlet spaced upwardly from the bottom of the forehearth, of a valve within the suction chamber normally closing the inlet and outlet, means for setting up a suction in said chamber to unseat the valve and open the outlet and inlet and to draw a portion of molten surface glass through the inlet, and means for subsequently subjecting the valve in said chamber to the action of air under pressure to eject molten glass through the outlet.

6. In glass feeding apparatus a container for holding molten glass, a tubular member resting on the bottom of the container and providing a suction chamber therein having a bottom outlet, there being an inlet opening into said chamber from a point spaced upwardly from the bottom of the container, a float valve in the suction chamber normally closing both the outlet and the inlet, means for subjecting said valve to suction for successively drawing molten glass into the chamber at the outlet and opening the inlet to admit molten surface glass from the container, and means for subjecting the valve to pressure to eject the admitted molten glass through the outlet.

7. Glass feeding apparatus including a container for molten glass, a structure supported on the bottom of the container having a bottom outlet, there being an inlet inclined downwardly into said structure from a point spaced upwardly from the bottom of the container, a freely movable float valve within said structure and means for operating the float valve to control the flow of glass through the inlet and to eject the glass through the outlet.

8. The combination with a forehearth for holding a body of molten glass at a predetermined level, of a suction chamber having an inlet above the bottom of the forehearth, there being an outlet at the bottom of the chamber, a valve, and means for reciprocating the valve to successively suck surface glass into said chamber through the inlet close the inlet, and deliver the glass under pressure through the outlet.

9. A forehearth for holding a body of molten glass at a predetermined level, and glass feeding apparatus including a suction chamber extending upwardly from the bottom of the forehearth and having an outlet for molten glass at the bottom thereof, there being an inlet to said chamber above the bottom thereof, means for successively sucking glass into the chamber through the inlet, closing the inlet, and delivering the glass under pressure through the outlet, and means for restoring normal pressure on the glass within said chamber between the sucking and closing operations.

10. The combination with a forehearth for holding molten glass at a predetermined level, of apparatus for feeding molten glass including a tubular member extending upwardly from the bottom of the forehearth providing a suction chamber having an outlet for glass at the bottom thereof, there being an inlet to said chamber above the bottom thereof, a freely movable valve, means for establishing a suction within said chamber to move the valve in one direction and draw a portion of molten surface glass into the chamber through the inlet, means for breaking the suction, and means for subjecting the valve in the chamber to the action of air under pressure to successively close the inlet and eject a portion of the glass through the outlet.

11. The combination of a forehearth for holding molten glass, means therein for retaining glass below a predetermined level, and an air operated float for successively withdrawing glass from above said level into the retaining means and ejecting it from the forehearth.

12. The combination with a forehearth for holding molten glass and having an outlet, of stationary means extending upwardly from the bottom of the forehearth opening into the outlet for receiving molten glass from the forehearth, said means having an inlet in its upwardly extended portion, and a slidable valve for successively closing the inlet to cut off the flow of glass from the forehearth to said means and then exerting pressure upon the glass in the path of the valve to forcibly expel the glass through the outlet.

13. The combination with a forehearth for holding molten glass and having an outlet, of stationary means opening into the outlet and extending upwardly from the bottom of the forehearth for receiving glass from the forehearth, said means having a glass inlet above the bottom of the forehearth, and an air operated cutoff valve for successively closing the inlet to cut off communication between said means and the forehearth thereby to trap glass between the valve and the outlet and thereafter to expel the glass under pressure through the outlet.

14. The combination with a forehearth for holding molten glass and having an outlet, of stationary means opening into the outlet and extending upwardly from the bottom of the forehearth for receiving molten glass from the forehearth, said means having a glass inlet above the bottom of the forehearth, a valve, and means for reciprocating the valve for successively closing the inlet to cut off the flow of glass from the forehearth to said means, exerting pressure upon the glass in the path of the valve to forcibly expel the glass through the outlet to form a gob, and retracting the valve to open the inlet and to suck back within the outlet until the inlet is opened, the tail of glass remaining after the severance of the gob.

CARL G. HILGENBERG.
CHARLES B. GARWOOD.